Patented Dec. 11, 1923.

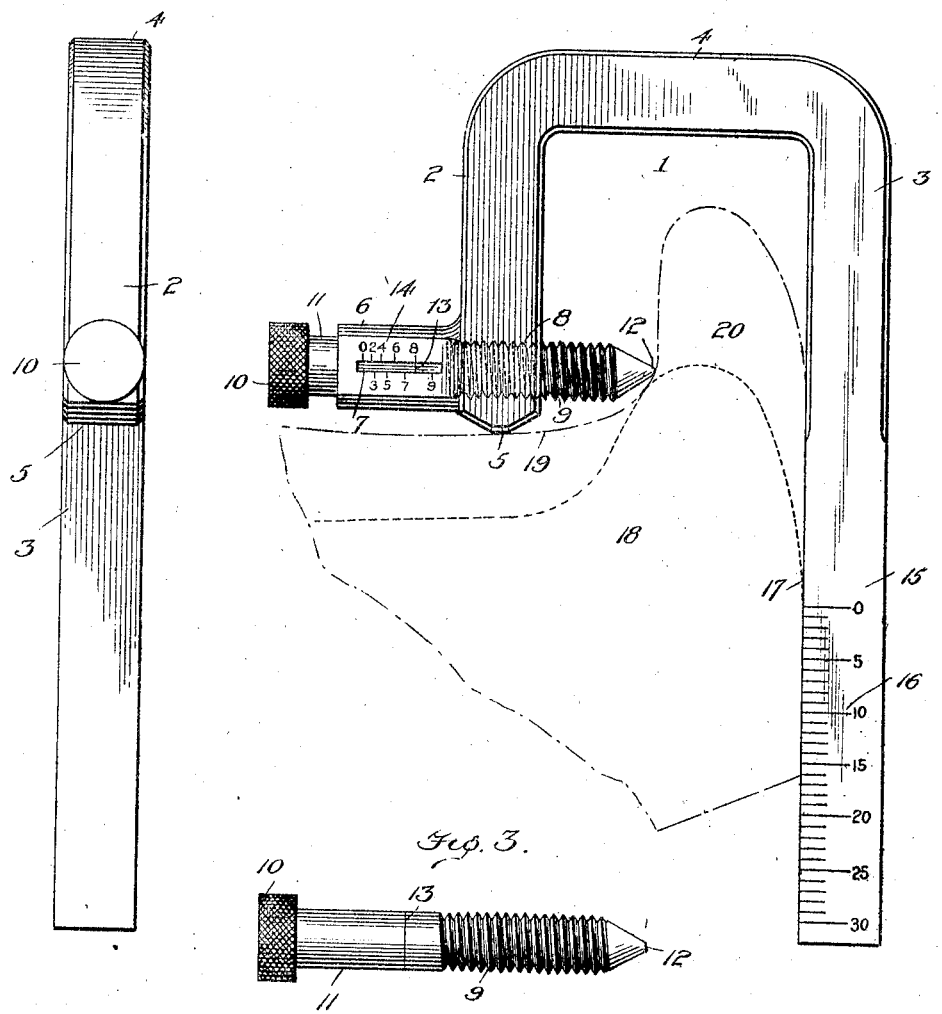

1,477,036

UNITED STATES PATENT OFFICE.

BERNARD COOK, OF ROANOKE, VIRGINIA.

SERVICE-METAL WHEEL GAUGE.

Application filed May 6, 1921. Serial No. 467,330.

*To all whom it may concern:*

Be it known that I, BERNARD COOK, a citizen of the United States, residing at Roanoke, in the county of Roanoke and State of Virginia, have invented certain new and useful Improvements in Service-Metal Wheel Gauges; and I do hereby declare the following to be a full, clear, and exact description of the invention, such as will enable others skilled in the art to which it appertains to make and use the same.

The invention relates to gauges or the like, and more particularly to a gauge designed for use in gaging car wheels after the same have been in service.

The principal object of the invention, broadly stated, is to provide a gauge of the character described which will clearly indicate the condition of a car wheel in relation to its fitness for service and which will also indicate in fractions of an inch or any other desired unit of measure the amount of material to be removed from the tread of the wheel to restore the wheel to correct contour.

Another object of the invention is to provide a wheel gauge which will indicate the amount of wear upon the wheel and which will indicate also by a direct reading the amount of service metal which will remain in the wheel after the same has been machined to the standard contour.

Other objects of the invention will hereinafter more fully appear from the detailed description of the preferred embodiment of the invention as illustrated in the accompany drawings wherein:—

Figure 1 is a view in side elevation of a gauge constructed in accordance with my invention, the said figure illustrating in dot and dash lines a worn car wheel and in dotted lines the proper contour to which the worn wheel must be restored in order to fit the same for service.

Figure 2 is a view in front elevation of the gauge.

Figure 3 is a view in side elevation of the micrometer screw which forms part of the gauge mechanism, Throughout the specification and drawings like parts are designated by like reference characters.

Before describing the invention in detail it is believed it will lead to a better understanding of the same if attention is directed to the method now employed in gaging car wheels after the same have been in service. It will be obvious that the tread portions of the car wheel, owing to the slippage of the same on the track, and owing to the application of the brakes and to the crowding of the flange portion of the wheels against the rail head will in course of time wear from the correct contour, and it is the common practice for the car inspectors to gauge the wheels of the various cars in order to determine whether or not the contour of the wheel has been so modified by wear as to render the same unfit for service. This gaging is done by what are known as contour gauges, and by these gauges the wheels are passed or rejected in accordance with whether they pass or fail to pass within the limit of wear. Car wheels which fail to pass this contour inspection are removed from the cars and are then gaged in order to determine the amount of service metal in the wheel and to determine whether or not these wheels can be trued or machined into a proper contour without the machining cutting the surface of the wheel below a definite fixed point required by the railroads as a safety point as well as the minimum diameter beyond which wheels cannot be used. The gagings which are required to determine the condition of the wheel are now rather complicated and require the services of at least two men. Not only is the cost of gaging high but the liability of error in these gagings is quite large. Both of these difficulties have been eliminated by the gauge which forms the subject matter of my invention.

The preferred embodiment of my service metal wheel gauge herein illustrated preferably comprises a frame 1 provided with arms, legs or members 2 and 3 of unequal length rigidly connected adjacent their upper ends by a transversely extending member 4. For convenience the frame 1 is formed from a single piece of metal which may be substantially rectangular in section.

At its lower end the arm 2 is wedge shaped as shown at 5 to provide a relatively narrow gauge point. The object of thus narrowing the foot of the arm 2 is to furnish the gauge with means which will enter the groove often formed in the wheel tread adjacent the base of the flange by the rail head.

Adjacent the lower end of the arm 2 I provide the arm with a laterally extending hollow boss 6 having a longitudinally extending slot or recess 7 therein. Axially of the recess in the boss 6 the arm 2 is provided with a threaded opening 8, and threadably received within said opening 8 is a micrometer screw 9. The said screw is provided with a milled head 10 and a shank 11, and terminates at its threaded end in a conical point 12. The shank 11 is provided with a circumferential groove or index line 13 which is adapted to be viewed through the recess 7 in the boss 6, the walls on opposite sides of the recess 7 carrying a scale 14 which, in connection with the index line 13, indicates the projection of the conical point 12 of the micrometer screw from normal or zero position.

The scale lines 14 are for convenience made in graduations of one sixteenth of an inch, but it will be understood that any desirable unit of linear measure may be substituted therefor in order to permit the gauge to be used in countries where the English standard is not employed.

The opposite leg 3 is provided on a lateral face 15 and preferably on the same side of the gauge as the micrometer scale, with a scale 16 adjacent the lower end of the said leg. This scale 16 is graduated to the same unit of measure as the scale 14, and is designed to correspond to the number of threads per inch of measurement of the micrometer screw. The scale 16 reads radially inwardly and is so positioned on the leg 3 as to read at 30 at the intersection thereof with the inner diameter of the flange portion wheel rim when said scale is applied to a new wheel of standard contour and dimension.

The operation of the device is as follows:—
The lowest point on the tread is ascertained by inspection and the wheel is so rotated as to bring this point to a convenient position. The gauge 1 is then applied to the wheel with the inner face of the leg 3 in contact with the face 17 of the wheel 18 and the gauge is then moved downwardly until the gauge point 5 is brought into contact with the wheel tread 19. The micrometer screw is then rotated by means of the milled head 10 until the point 12 thereof contacts with the inner face of the flange 20. The operator then reads on the micrometer scale the projection of the micrometer screw from normal and notes on the scale 16 the exact line opposite the intersection of the leg 3 with the inner diameter of the wheel tread. As illustrated in the drawings, the micrometer screw has been projected eight sixteenths or one half an inch and the scale 16 at the base of the tread reads 16. The reading on the micrometer scale denotes that eight sixteenths or one half an inch of metal must be removed from the tread in order to restore the same to normal contour, and the difference between the reading of the scale 16 and the scale 14 or sixteen minus eight, leaving eight sixteenths or one half an inch, indicates that after the one half inch of metal is removed from the tread there will remain in the wheel one half an inch of service metal. It is obvious that these simple scale readings render impossible all mistakes in calculation and enable a single operator to accurately determine the amount of metal to be removed and the condition of the wheel after the removal of this metal.

I claim:—

1. A gauge comprising a pair of connected members, one of which is provided with a projection having a bearing surface adapted to contact the lowest portion of the tread of a flanged wheel, a micrometer screw gauge provided on said arm and having a portion adapted to be moved against the inner face of the flange of said wheel when the aforesaid projection is positioned in the lowest portion of the tread, and the other of said members being provided with a scale adapted to lie against the outer face of the flange of the wheel and cooperate with the micrometer gauge for computing a result incident to the readings.

2. An instrument of the class described involving a pair of members connected at one end and providing relatively narrow arms, one of said arms being of greater length than the other and having a scale thereon adapted to measure the width of the outer face of the flange of a car wheel, the other of said arms being provided with a portion adapted to enter the lowest part of the tread of said car wheel, said last named arm being provided with a scale having an associated movable member arranged to contact the inner face of the flange of the car wheel when the portion of the second named arm is bearing on the lowest portion of the tread, whereby from the readings of both of said scales the amount of metal to be removed from the flanged car wheel to restore the same to normal contour can be determined, and also the amount of service metal remaining in said wheel after the restoration thereof to said normal contour.

3. A gauge for flanged car wheels comprising a pair of arms or members, means connecting said members adjacent one end thereof, one of said members being of greater length than the other, said last named member being adapted to be applied upon the outer face of the flange and provided with a fixed uniform scale thereon, said scale being readable radially inwardly of said flange, the shorter of said members having a relatively small bearing portion adapted to contact the lower point of the tread of said wheel, said shorter member or arm also being provided with a scale, and micrometer means for obtaining a reading from said last named scale, which reading is capable of computation with the reading from the fixed scale provided on the longer arm.

4. A gauge comprising a plurality of spaced arms or members extending substantially parallel to each other, each of said members being provided with a scale, means connecting said members, movable means cooperating with the scale carried by one of said members, both of said scales being graduated in like units of measurement and adapted to cooperate to permit computations for determining the amount of metal to be removed from a worn flanged wheel to restore the same to normal contour, and also to determine the amount of service metal remaining in said wheel after the restoration thereof.

5. A gauge of the class described involving a U-shaped member formed with a pair of substantially parallel relatively narrow arms, one of said arms having a scale thereon adapted to measure the width of the outer face of the flange of a car wheel, the other of said arms being provided with a portion adapted to enter the lowest part of the tread of a car wheel, and means including a micrometer having a portion movable against the inner face of the flange of the car wheel when the portion of said second named arm is in the lowest part of the tread, whereby from the combined readings of said micrometer and the first named scale there can be computed the amount of metal to be removed from the flanged car wheel to restore the same to normal contour and also the amount of service metal remaining in said wheel after said restoration.

6. A gauge for flanged wheels comprising a pair of substantially parallel members each having a scale, one of said members being formed with a relatively small bearing portion adapted to seat upon the lowest part of the tread of a flanged wheel, means carried by said member for engaging the adjacent portion of the flange of said wheel, the other of said parallel members being arranged to contact the outer face of the flanged wheel adjacent the flange thereof, said scales cooperating to obtain readings for computing the amount of metal to be removed from the flanged car wheel to restore the same to normal contour and also the amount of service metal remaining in said wheel after restoration.

7. A gauge for flanged wheels comprising a pair of rigidly connected members, one of which is provided with an adjustable gauge device, said member having a relatively small bearing portion arranged to have a point of engagement with the lowest part of the worn tread of the wheel, the other member of said gauge being adapted to contact the outer face of the rim of said wheel to control the position of the first mentioned member, said members each being provided with scales, one of which cooperates with the adjustable gauge device for obtaining a reading which is capable of computation with the reading from the scale of the other member.

8. The combination with a flanged wheel having a normally curved tread, of a gauge therefor comprising a frame, one arm of which is provided with a relatively small bearing portion adapted to be seated on the lowest part of the worn portion of the tread, movable means carried by said arm for engaging the flange of the wheel at a point adjacent the tread thereof, the other arm being adapted to engage the outer face of the flanged wheel, one of said arms being provided with means for indicating the amount of metal to be removed from said wheel to restore the same to normal contour, and the other of said arms having means cooperating with the aforesaid indicating means for designating the amount of service metal which will remain in said wheel after the removal of the aforesaid metal in restoring the wheel to normal contour.

9. A gauge for flanged wheels comprising a member having a small bearing portion adapted to enter and engage the lowest part of the worn surface or tread of a wheel adjacent the flange thereof, and means carried by said gauge for positioning the said member, said gauge being provided with means for indicating the amount of metal to be removed from said wheel to restore the same to normal contour, the means for positioning the gauge being adapted to cooperate with the indicating means to determine the amount of service metal remaining in the wheel after its restoration to normal contour.

10. A gauge for flanged wheels comprising a pair of suitably connected spaced members, one of said members having a pointed portion forming a bearing surface adapted to contact the lowest part of a worn tread of a flanged wheel adjacent the flange thereof, and means carried by said last named member and having a portion adapted to contact said adjacent flange, said pointed member having fixed thereon means serving to indicate the amount of metal which must be removed from said wheel to restore the same to normal contour for service.

In testimony whereof I affix my signature.

BERNARD COOK.